United States Patent
Haltiner, Jr. et al.

(10) Patent No.: US 6,744,235 B2
(45) Date of Patent: Jun. 1, 2004

(54) OXYGEN ISOLATION AND COLLECTION FOR ANODE PROTECTION IN A SOLID-OXIDE FUEL CELL STACK

(75) Inventors: Karl J. Haltiner, Jr., Fairport, NY (US); Subhasish Mukerjee, Rochester, NY (US); Diane M. England, Bloomfield, NY (US); Michael T. Faville, Geneseo, NY (US); Sean M. Kelly, Churchville, NY (US); Bernhard Edlinger, Augsburg (DE); Joachim Tachtler, Ismaning (DE)

(73) Assignee: Delphi Technologies, Inc., Troy, MI (US)

( * ) Notice: Subject to any disclaimer, the term of this patent is extended or adjusted under 35 U.S.C. 154(b) by 74 days.

(21) Appl. No.: 10/178,819

(22) Filed: Jun. 24, 2002

(65) Prior Publication Data

US 2003/0235747 A1 Dec. 25, 2003

(51) Int. Cl.$^7$ .............................................. H01M 10/46
(52) U.S. Cl. ....................................................... 320/101
(58) Field of Search ............................ 320/101; 429/12, 429/13, 17, 22, 23

(56) References Cited

U.S. PATENT DOCUMENTS 6,475,655 B1 * 11/2002 Nakanishi et al. ............ 429/19
6,608,463 B1 * 8/2003 Kelly et al. ................. 320/101

* cited by examiner

Primary Examiner—Edward Tso
(74) Attorney, Agent, or Firm—Paul L. Marshall

(57) ABSTRACT

In a fuel cell assembly, nickel-based anodes are readily oxidized when exposed to oxygen as may happen through atmospheric invasion of the assembly during cool-down following shutdown of the assembly. Repeated anode oxidation and reduction can be destructive of the anodes, leading to cracking and failure. To prevent such oxygen migration, check valves and oxygen getter devices containing oxygen-scavenging material such as metallic nickel are provided in the reformate passageways leading to and from the anodes. The check valves preferably are closed by gravity. Oxidation of the oxygen-gettering material is readily reversed through reduction by reformate when the assembly is restarted.

22 Claims, 4 Drawing Sheets

US 6,744,235 B2

OXYGEN ISOLATION AND COLLECTION FOR ANODE PROTECTION IN A SOLID-OXIDE FUEL CELL STACK

TECHNICAL FIELD

The present invention relates to hydrogen/oxygen fuel cells having a solid-oxide electrolytic layer separating an anode layer from a cathode layer; more particularly, to fuel cell stack assemblies and systems comprising a nickel-based anode; and most particularly, to such fuel cell assemblies and systems wherein the anode is protected from oxidation, especially during cool-down after the assembly has been shut down.

BACKGROUND OF THE INVENTION

Fuel cells which generate electric current by the electrochemical combination of hydrogen and oxygen are well known. In one form of such a fuel cell, an anodic layer and a cathodic layer are separated by an electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ anions catalytically by the cathode. The oxygen anions transport through the electrolyte and combine at the anode/electrolyte interface with four hydrogen ions to form two molecules of water. The anode and the cathode are connected externally through a load to complete the circuit whereby four electrons are transferred from the anode to the cathode. When hydrogen is derived from "reformed" hydrocarbons, the "reformate" gas includes CO which is converted to $CO_2$ at the anode via an oxidation process similar to that performed on the hydrogen. Reformed gasoline is a commonly used fuel in automotive fuel cell applications.

A single cell is capable of generating a relatively small voltage and wattage, typically between about 0.5 volt and about 1.0 volt, depending upon load, and less than about 2 watts per $cm^2$ of cell surface. Therefore, in practice it is usual to stack together, in electrical series, a plurality of cells. Because each anode and cathode must have a free space for passage of gas over its surface, the cells are separated by perimeter spacers which are vented to permit flow of gas to the anodes and cathodes as desired but which form seals on their axial surfaces to prevent gas leakage from the sides of the stack. The perimeter spacers include dielectric layers to insulate the interconnects from each other. Adjacent cells are connected electrically by "interconnect" elements in the stack, the outer surfaces of the anodes and cathodes being electrically connected to their respective interconnects by electrical contacts disposed within the gas-flow space, typically by a metallic foam which is readily gas-permeable or by conductive filaments. The outermost, or end, interconnects of the stack define electric terminals, or "current collectors," which may be connected across a load.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack. A complete SOFC assembly also includes appropriate piping and valving, as well as a programmable electronic control unit (ECU) for managing the activities of the subsystems simultaneously.

The anodes of cells in a fuel cell assembly typically include metallic nickel and/or a nickel cermet (Ni—YSZ) which are readily oxidized. During operation of an assembly, the anodes are in a reduced state. A problem exists in that the anodes are vulnerable to oxidation by atmospheric oxygen which can enter the stacks via the reformate passageways during cool-down of the assembly. The anodes are still hot enough that oxidation of the nickel can occur readily, and gas compositions (reformate) which can prevent such oxidation are no longer flowing through the stack. The grain growth of the nickel in the anode cermet during operation can lead to severe stresses caused by the volume changes associated with the oxidation/reduction cycles experienced by the nickel in the cermet. Repeated oxidation and reduction of nickel in the cermet anodes can lead to severe mechanical stresses because of volume differences between metallic nickel and nickel oxide, and can result in catastrophic cracking of the anodes.

It is a principal object of the present invention to protect the nickel anodes of a fuel cell from structural degradation by periodic oxidation and reduction of the nickel.

It is a further object of the present invention, through such prevention, to improve the reliability and extend the lifetime of solid oxide fuel cells.

BRIEF DESCRIPTION OF THE INVENTION

Briefly described, in a fuel cell assembly, for example, a solid-oxide fuel cell assembly, metallic nickel in a Ni—YSZ anode is readily oxidized when exposed to oxygen as may happen through atmospheric invasion of the assembly during cool-down following shutdown of the assembly. Anodes are in an oxidized equilibrium state when the assembly is fabricated and are then reduced by fuel such as reformate when the assembly is first turned on. Repeated anode oxidation and reduction can affect the structure of the anodes and can lead to cracking and failure of the anodes and thus the entire assembly. To prevent such oxygen migration and re-oxidation, a set of passive devices are employed which are low in cost, simple to implement, and do not require any electronic controls or power.

First, oxygen intrusion is minimized by installation of check valves in the fuel flow passages upstream and downstream of the anodes. The check valves include balls formed of high-temperature materials and are held in place on a valve seat by gravity. The weight of the ball and the size of the seat determine the pressure drop across the valve.

Second, because oxygen is bound to eventually leak around the check valves and into the anode passages given sufficient time, oxygen getter devices, containing oxygen-gettering material such as metallic nickel, are provided in the fuel passageways leading to and from the anodes. Oxidation of the oxygen-gettering material is readily reversed through reduction by fuel when the assembly is restarted.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
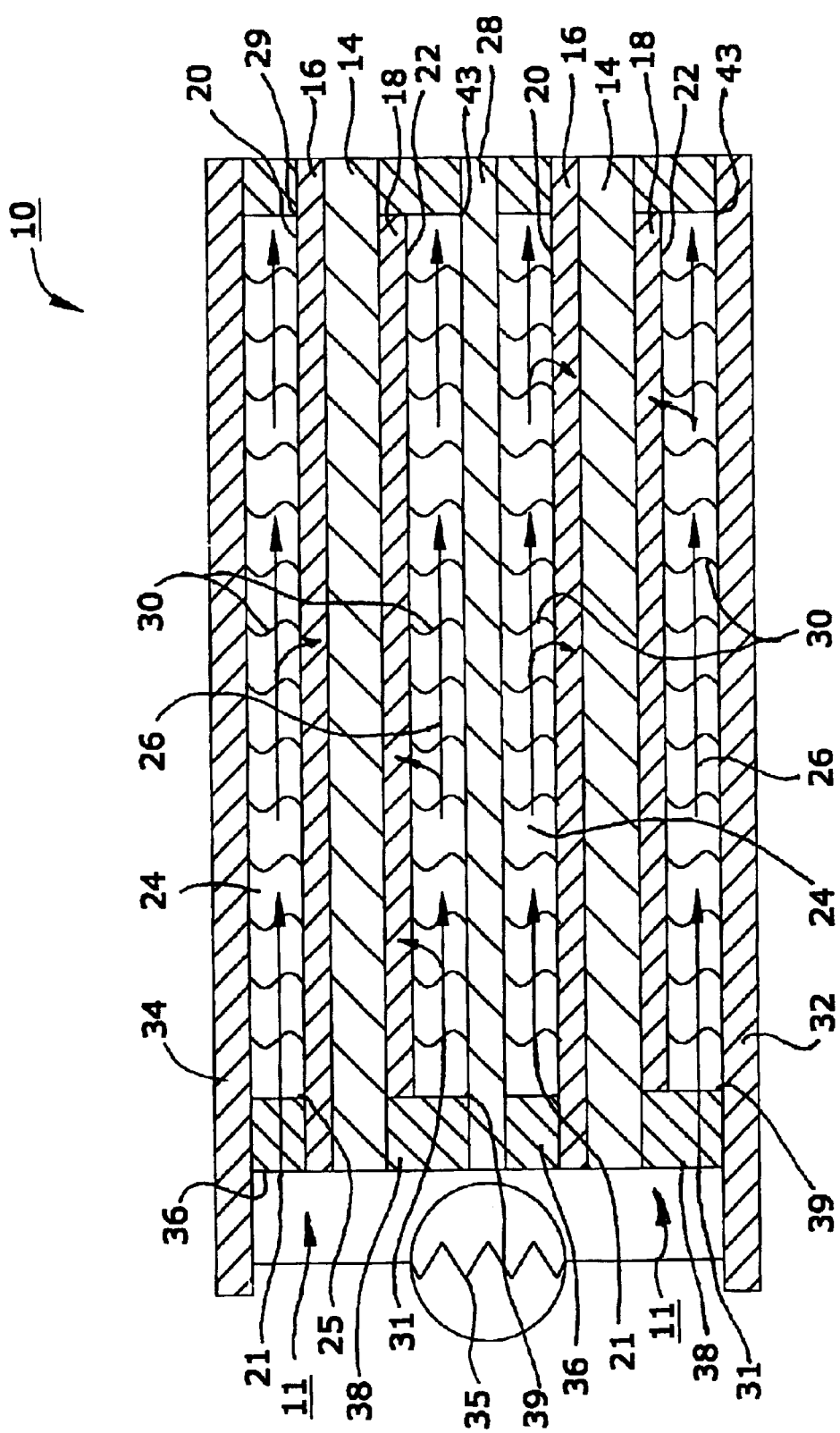
FIG. 1 is a schematic cross-sectional view of a two-cell stack of solid oxide fuel cells.

Referring to FIG. 1, a fuel cell stack 10 includes elements known in the art of solid oxide fuel cell stacks comprising more than one fuel cell. The example shown includes two identical fuel cells 11, connected in series, and is of a class of such fuel cells said to be "anode-supported" in that the anode is a structural element having the electrolyte and cathode deposited upon it. Element thicknesses as shown are not to scale.

Each fuel cell 11 includes an electrolyte element 14 separating an anodic element 16 and a cathodic element 18. Each anode and cathode is in direct chemical contact with its respective surface of the electrolyte, and each anode and cathode has a respective free surface 20,22 forming one wall of a respective passageway 24,26 for flow of gas across the surface. Anode 16 of a first fuel cell 11 faces and is electrically connected to an interconnect 28 by filaments 30 extending across but not blocking passageway 24. Similarly, cathode 18 of a second fuel cell 11 faces and is electrically connected to interconnect 28 by filaments 30 extending across but not blocking passageway 26. Similarly, cathode 18 faces and is electrically connected to a cathodic current collector 32 by filaments 30 extending across but not blocking passageway 26, and anode 16 faces and is electrically connected to an anodic current collector 34 by filaments 30 extending across but not blocking passageway 24. Current collectors 32,34 may be connected across a load 35 in order that the fuel cell stack 10 performs electrical work. Passageways 24 are formed by anode spacers 36 between the perimeter of anode 16 and either interconnect 28 or anodic current collector 34. Passageways 26 are formed by cathode spacers 38 between the perimeter of electrolyte 14 and either interconnect 28 or cathodic current collector 32. Anode spacer 36 and cathode spacer 38 are formed from sheet stock in such a way to yield the desired height of the anode passageways 24 and cathode passageways 26.

Preferably, the interconnect and the current collectors are formed of an alloy, typically a "superalloy," which is chemically and dimensionally stable at the elevated temperatures necessary for fuel cell operation, generally about 750° C. or higher, for example, Hastelloy, Haynes 230, or a stainless steel. The electrolyte is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed of, for example, a mixture of nickel and YSZ.

In operation (FIG. 1), reformate gas 21 is provided to passageways 24 at a first edge 25 of the anode free surface 20, flows parallel to the surface of the anode across the anode in a first direction, and is removed at a second and opposite edge 29 of anode surface 20. Hydrogen and CO diffuse into the anode to the interface with the electrolyte. Oxygen 31, typically in air, is provided to passageways 26 at a first edge 39 of the cathode free surface 22, flows parallel to the surface of the cathode in a second direction which can be orthogonal to the first direction of the reformate (second direction shown in the same direction as the first for clarity in FIG. 1), and is removed at a second and opposite edge 43 of cathode surface 22. Molecular oxygen gas ($O_2$) diffuses into the cathode and is catalytically reduced to two $O^{-2}$ ions by accepting four electrons from the cathode and the cathodic current collector 32 or the interconnect 28 via filaments 30. The electrolyte ionically conducts or transports $O^{-2}$ anions to the anode electrolyte innerface where they combine with four hydrogen atoms to form two water molecules, giving up four electrons to the anode and the anodic current collector 34 or the interconnect 28 via filaments 30. Thus cells 11 are connected in series electrically between the two current collectors, and the total voltage and wattage between the current collectors is the sum of the voltage and wattage of the individual cells in a fuel cell stack.

Figure 2:
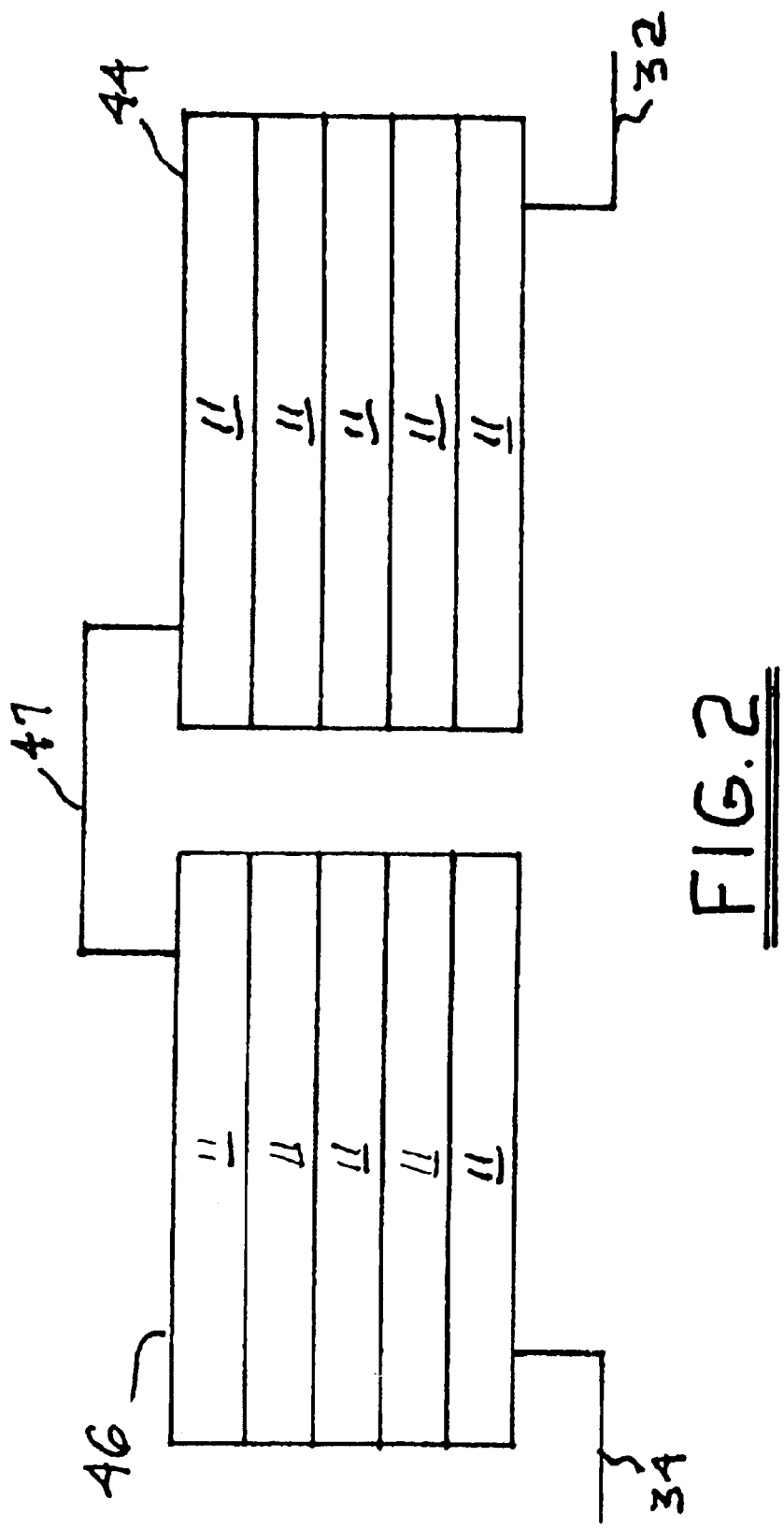
FIG. 2 is a schematic elevational view of two fuel cell stacks electrically connected in series.

Referring to FIG. 2, the cells 11 are arranged side-by-side rather than in overlapping arrangement as shown in FIG. 1. Further, the side-by-side arrangement may comprise a plurality of cells 11, respectively, such that each of first stack 44 and second stack 46 shown in FIG. 2 is a stack of identical fuel cells 11. The cells 11 in stack 44 and stack 46 are connected electrically in series by interconnect 47, and the stacks are connected in series.

Figure 3:
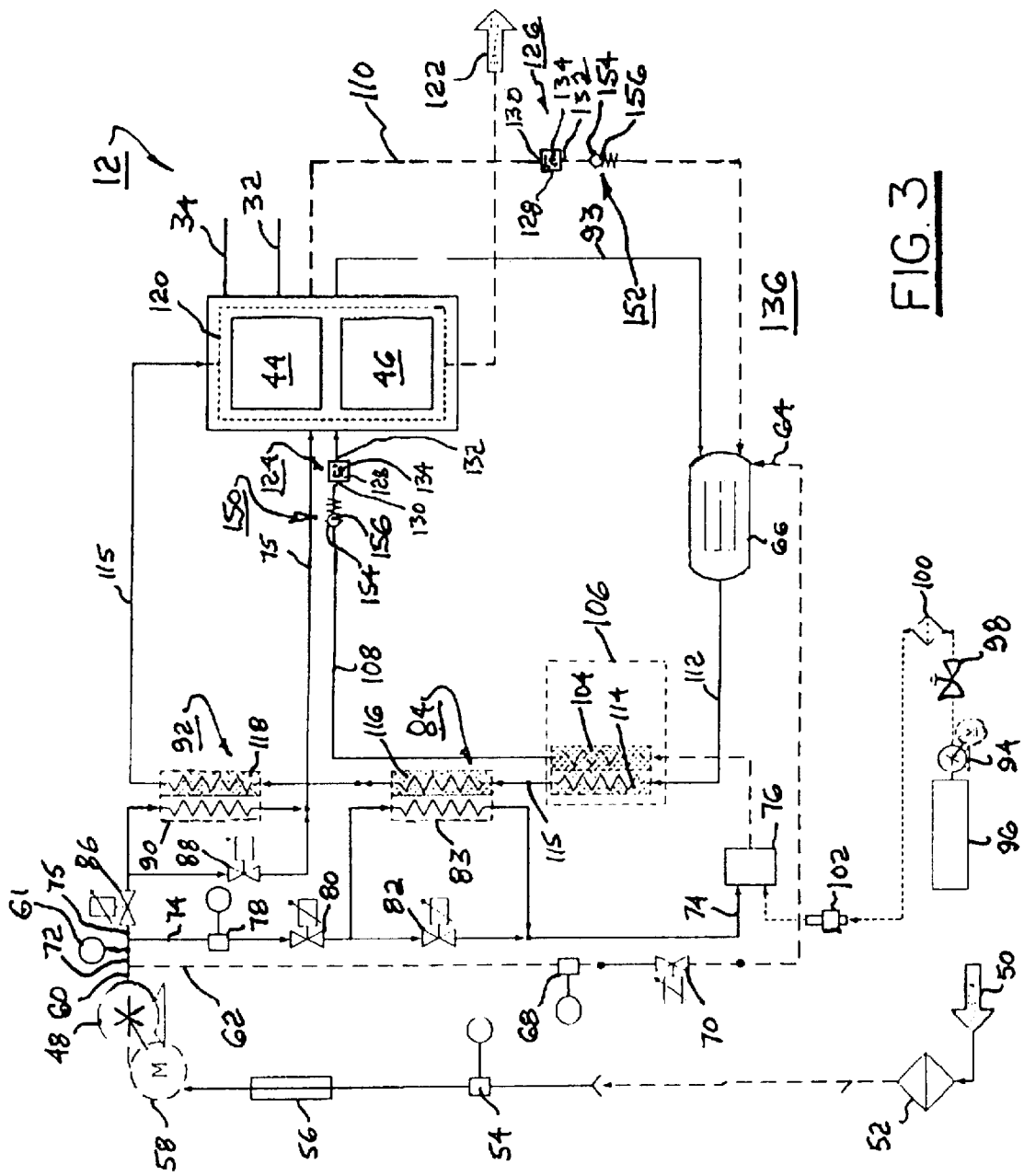
FIG. 3 is a schematic mechanization diagram of an SOFC assembly, showing the incorporation of check valves and oxygen getter devices in fuel passageways leading into and out of the anodes.
Figure 4:
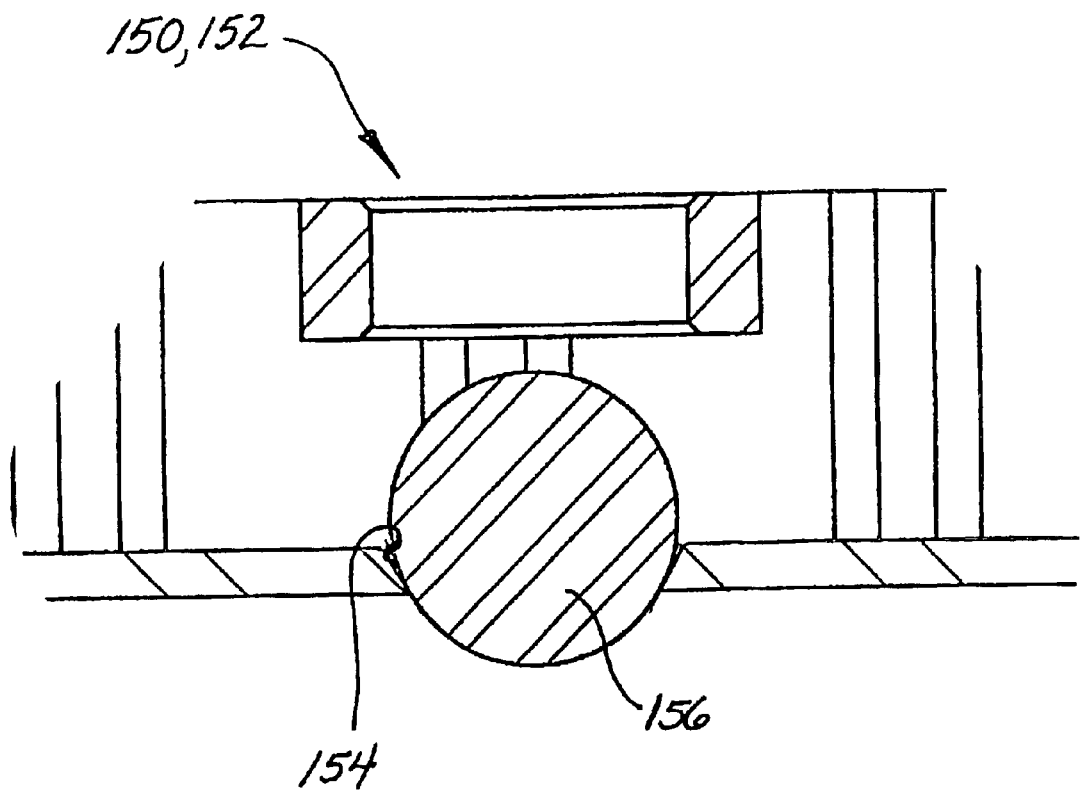
FIG. 4 is a detailed cross-sectional view of the check valves shown in FIG. 3.

Referring to FIG. 3, the diagram of a solid-oxide fuel cell assembly 12 includes auxiliary equipment and controls for stacks 44,46 electrically connected as in FIG. 2.

A conventional high speed inlet air pump 48 draws inlet air 50 through an air filter 52, past a first MAF sensor 54, through a sonic silencer 56, and a cooling shroud 58 surrounding pump 48.

Air output 60 from pump 48, at a pressure sensed by pressure sensor 61, is first split into branched conduits between a feed 62 and a feed 72. Feed 62 goes as burner cooling air 64 to a stack afterburner 66 via a second MAF sensor 68 and a burner cool air control valve 70.

Feed 72 is further split into branched conduits between an anode air feed 74 and a cathode air feed 75. Anode feed 74 goes to a hydrocarbon fuel vaporizer 76 via a third MAF sensor 78 and reformer air control valve 80. A portion of anode air feed 74 may be controllably diverted by control valve 82 through the cool side 83 of reformate pre-heat heat exchanger 84, then recombined with the non-tempered portion such that feed 74 is tempered to a desired temperature on its way to vaporizer 76.

Cathode air feed 75 is controlled by cathode air control valve 86 and may be controllably diverted by cathode air preheat bypass valve 88 through the cool side 90 of cathode air pre-heat heat exchanger 92 on its way to stacks 44,46. After passing through the cathode sides of the cells in stacks 44,46, the partially spent, heated air 93 is fed to burner 66.

A hydrocarbon fuel feed pump 94 draws fuel from a storage tank 96 and delivers the fuel via a pressure regulator 98 and filter 100 to a fuel injector 102 which injects the fuel into vaporizer 76. The injected fuel is combined with air feed 74, vaporized, and fed to a reformer catalyst 104 in main fuel reformer 106 which reforms the fuel to, principally, hydrogen and carbon monoxide. Reformate 108 from catalyst 104 is fed to the anodes in stacks 44,46. Unconsumed fuel 110 from the anodes is fed to afterburner 66 where it is combined with air supplies 64 and 93 and is burned. The hot burner gases 112 are passed through a cleanup catalyst 114 in main reformer 106. The effluent 115 from catalyst 114 is passed through the hot sides 116,118 of heat exchangers 84, 92, respectively, to heat the incoming cathode and anode air. The partially-cooled effluent 115 is fed to a manifold 120 surrounding stacks 44,46 from whence it is eventually exhausted 122.

Still referring to FIG. 3, a first check valve 150 and a first oxygen getter device 124 are provided in the conduit feeding fuel such as, for example, pure hydrogen or reformate 108 to the anodes (not visible) in stacks 44,46. A second check valve 152 and second oxygen getter device 126 are similarly provided in the conduit feeding spent fuel 110 from the anodes to afterburner 66. As described above, during cool-down of the fuel cell stacks after shut-down of the assembly, it is important to prevent migration of oxygen into anode passages 24 wherein anode surface 20, comprising metallic nickel, would be subject to damaging oxidation. Each check valve includes a typical frusto-conical valve seat 154 receptive of a valve ball 156. Preferably, each valve 150,152 is oriented within assembly 12 such that the ball is held in the seat by gravity when reformate is flowed through the system in the forward direction. Thus, fuel flow opens the valve sufficiently for fuel to pass in the forward direction. When assembly 12 is shut down, each valve is closed by gravity. The valves may not be identical, as oxygen flows opposite to the reformate in valve 152, but in the same direction as the reformate in valve 150; the so the balls and seats may require different weights and/or sizes to function as intended.

Each getter 124,126 includes a passageway 128 having an inlet 130 and an outlet 132 through which fuel is passed during operation of the fuel cell assembly. Within the passageway is a readily-oxidized material 134 (oxygen-reducing means), for example, nickel metal foam, nickel wire or nickel mesh, which is capable of gettering oxygen by reaction therewith but which does not present a significant obstruction to flow of fuel through the passageway. Nickel in the getters reacts with oxygen to produce nickel oxide, NiO, when the assembly is shut down, thus protecting the nickel-containing anodes from oxidation. When the assembly is turned back on, fuel is again produced which, in passing through the getters, reduces the NiO back to metallic nickel, allowing the getters to be used repeatedly.

An SOFC assembly in accordance with the invention is especially useful as an auxiliary power unit (APU) for vehicles 136 on which the APU may be mounted as shown in FIG. 3, such as cars and trucks, boats and ships, and airplanes, wherein motive power is supplied by a conventional engine and the auxiliary electrical power needs are met by the SOFC assembly.

An SOFC assembly in accordance with the invention is also useful as a stationary power plant such as, for example, in a household or for commercial usage.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. In a fuel cell assembly including nickel-containing anodes and passageways leading to and from the anodes for conducting fuel to and from the anodes, the improvement comprising valve means and oxygen getter means disposed in each of said passageways for preventing gaseous oxygen from reaching and oxidizing said nickel in said anodes.

2. A fuel cell assembly in accordance with claim 1 wherein said getter means comprises:
   a) a passageway having an inlet and an outlet for passage of gas therethrough; and
   b) reducing means disposed within said passageway for reacting with oxygen.

3. A fuel cell assembly in accordance with claim 2 wherein said reducing means includes metallic nickel.

4. A fuel cell assembly in accordance with claim 3 wherein said metallic nickel is in a form selected from the group consisting of nickel metal foam, nickel wire and nickel mesh.

5. A fuel cell assembly in accordance with claim 2 wherein said reducing means includes nickel alloy.

6. A fuel cell assembly in accordance with claim 5 wherein said nickel alloy is in a form selected from the group consisting of nickel metal foam, nickel wire, and nickel mesh.

7. A fuel cell assembly in accordance with claim 1 wherein said oxidation of said reducing means is reductively reversible by fuel.

8. A fuel cell assembly in accordance with claim 1 wherein said valve means includes at least one check valve.

9. A fuel cell assembly in accordance with claim 8 wherein said check valve includes:
   a) a valve seat; and
   b) a spherical valve head variably matable with said valve seat to regulate flow through said valve means.

10. A fuel cell assembly in accordance with claim 9 wherein said valve seat is frusto-conical.

11. A fuel cell assembly in accordance with claim 10 wherein said frusto-conical seat tapers outwards in a gravitationally upwards direction such that said valve head is urged toward said seat by gravity and that said valve may be opened by forward flow of fuel therethrough.

12. A fuel cell assembly in accordance with claim 1 wherein said assembly is mounted on a vehicle.

13. A fuel cell assembly in accordance with claim 1 wherein said assembly is mounted stationary.

14. A fuel cell assembly in accordance with claim 12 wherein said vehicle is selected from the group consisting of car, truck, boat, and airplane.

15. A fuel cell assembly in accordance with claim 12 wherein said assembly is an auxiliary power unit for said vehicle.

16. A fuel cell assembly in accordance with claim 1 wherein said fuel cell is a solid-oxide fuel cell.

17. In a fuel cell assembly including nickel-containing anodes and passageways leading to and from the anodes for conducting fuel to and from the anodes, the improvement comprising valve means disposed in each of said passageways for preventing gaseous oxygen from reaching and oxidizing said nickel in said anodes.

18. A fuel cell assembly in accordance with claim 17 wherein said valve means includes at least one check valve.

19. A fuel cell assembly in accordance with claim 18 wherein said check valve includes:
   a) a valve seat; and
   b) a spherical valve head variably matable with said valve seat to regulate flow through said valve means.

20. A fuel cell assembly in accordance with claim 19 wherein said valve seat is frusto-conical.

21. A fuel cell assembly in accordance with claim 20 wherein said frusto-conical seat tapers outwards in a gravitationally upwards direction such that said valve head is urged toward said seat by gravity and that said valve may be opened by forward flow of fuel therethrough.

22. A vehicle, comprising a fuel cell assembly for generating auxiliary power for said vehicle, said assembly including
   nickel-containing anodes,
   passageways leading to and from said anodes for conducting fuel to and from said anodes, and
   valve means and oxygen getter means disposed in each of said passageways for preventing gaseous oxygen from reaching and oxidizing said nickel in said anodes.

* * * * *